Nov. 18, 1941.    S. S. YEAGER    2,263,326
AIRPLANE AUTOMATIC SAFETY SWITCH
Filed Aug. 22, 1940
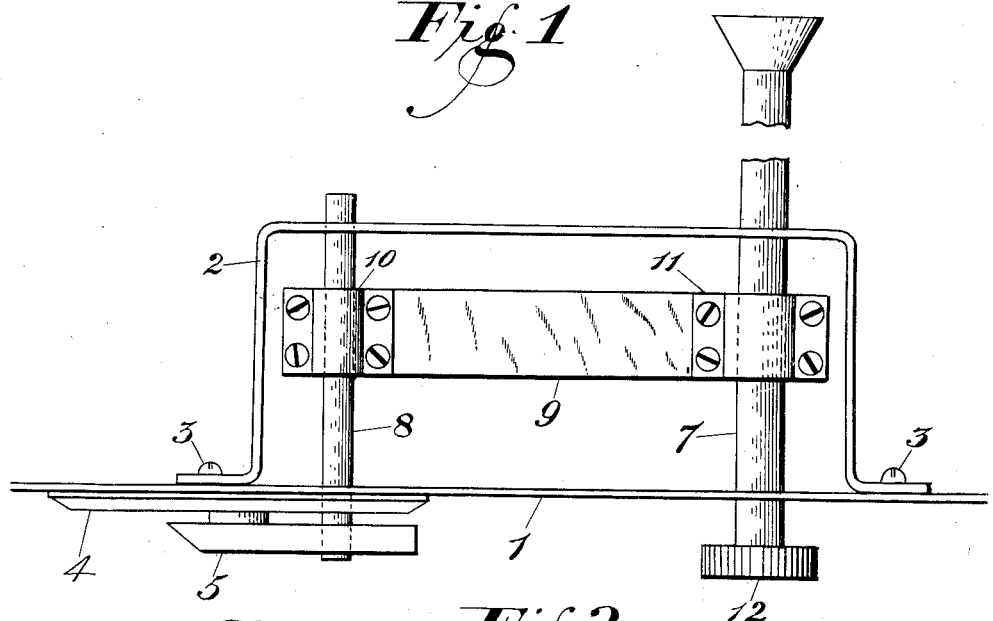
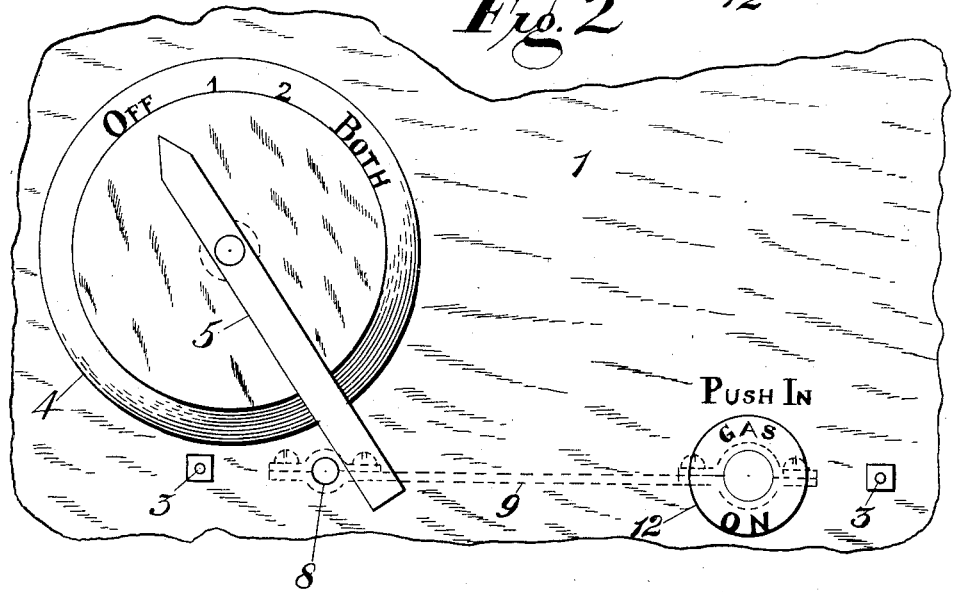
Samuel S. Yeager
Inventor
By E. E. Overholt
Attorney Patented Nov. 18, 1941

2,263,326

UNITED STATES PATENT OFFICE 2,263,326

AIRPLANE AUTOMATIC SAFETY SWITCH

Samuel S. Yeager, Reading, Pa.

Application August 22, 1940, Serial No. 353,731

5 Claims. (Cl. 123—198)

My invention relates to safety devices for airplanes, and is particularly adapted for use on planes designed for student pilots; the primary object being to prevent inexperienced or forgetful pilots from taking off without opening the gasoline valve, after having made a landing and closed said valve.

After an airplane has landed and stopped, the operator moves the magneto switch out of contact position, and then cuts off the fuel supply from the gas tank by closing the gas-supply valve. This, however, leaves the carbureter and the fuel-supply pipes leading thereto from the shut-off valve, full of gasoline.

This gasoline remaining in the supply pipes after a landing has been made, is of sufficient quantity to get the motor started and going at full speed when it is desired to make another take off. Hence it is not an infrequent occurrence for an inexperienced pilot to get his machine into the air, in utter disregard of the fact that he has forgotten to open his gas-supply valve: and presently the gas in the carbureter and supply line is exhausted, and the motor stops. The plane will be in the air, but will have attained so little altitude that a forced landing with its attendant inconvenience and danger is inevitable.

All this grows out of the single fact that the operator forgot to open the gas-supply valve in the outset; and applicant proposes to remedy this defect at a single stroke, by providing a simple construction which (when it is desired to start the motor again, after a landing has been made), will compel the operator to open the gas-supply valve first thing, even before the magneto switch can be placed in contact position, so as to furnish the necessary electric spark. This is the main object of the invention.

A specific object subsidiary to this is to so relate the gas-supply mechanism to the magneto switch, that the closing of the gas-supply valve which always takes place after a landing is made will automatically block the magneto switch in its normal, non-contact position, while, on the other hand, the opening of this gas-supply valve will automatically unblock said magneto switch.

A leading feature of the invention consists of a blocking rod or bolt arranged to move simultaneously, with the valve opening and closing mechanism, into and out of the path of the magneto switch, whereby to block said switch in its non-contact position when the valve is closed, and to unblock the same when the valve is opened.

The invention consists in certain novel features of construction and relative arrangement of parts, as will be hereinafter described and claimed, reference being had to the accompanying drawing, in which:

Fig. 1 is a top plan view of one embodiment of my invention as it would appear applied to the dashboard of an airplane; and Fig. 2 is a broken elevation of the inner side of the dashboard with the invention attached thereto as shown in Fig. 1.

Referring further to the drawing, the numeral 1 indicates the dashboard of an airplane; while 2 is a supporting bracket secured thereto by screw bolts 3. The magneto dial 4 carrying the magneto switch 5 rotatably mounted thereon, is located on the inner side of the dashboard preferably facing the driver's left. It will be noticed that the lower end of this magneto switch extends a material distance below the lower side of the dial, while the switch-stop pin 8 is slidably mounted in the dashboard and supporting bracket in a plane underneath the magneto dial 4. This switch-stop pin 8 and the gas-control rod 7 are in the same horizontal plane, and are both rigidly connected to each other by the connecting bar 9, which has at its left end a clamp 10 for engaging the switch-stop pin 8, and at its right end a clamp 11 for rigid engagement with the gas-control rod 7. Hence it will be seen that when the gas-control rod 7 is pulled inwardly to cut off the gas, as indicated in the drawing, the switch-stop pin 8 will also be moved inwardly, and will project into the path of the lower projecting end of the magneto switch 5, as shown in Fig. 2 of the drawing. And since this magneto switch 5 stands normally in its "off," or non-contact position, the projecting inner end of the switch-stop pin 8 will prevent the movement of the magneto-switch 5 toward its contact position.

As to the operation of the device, it needs only to be repeated that when the plane is brought down to make a landing, the magneto-switch 5 is naturally moved to its non-contact position, to stop the engine. This is the position it is shown in in Fig. 2. Then the gas-control rod 7 is pulled inwardly by means of the head 12, in order to cut off the flow of gas to the carbureter: and that leaves the parts in the relative positions indicated in the drawing, with the magneto switch 5 blocked in its non-contact position. Hence, when the pilot desires to take off on another flight, he is obliged to push his gas-control rod 7, forwardly in order to unblock his magneto-switch 5 preparatory to moving it into contact position. Thus it will be seen that my device insures that the gas shall be turned on before the engine can be started up. And that is the prime object of the invention.

It will, of course, be understood that I do not limit myself to the single embodiment of my invention shown and described herein, but desire protection on all that comes within the spirit and scope of my invention.

What I claim is:

1. In a flying machine adapted to be operated by gas, a magneto switch for opening and closing the circuit furnishing the electric spark for igniting the gas; said magneto switch being normally in its non-contact position; a longitudinally movable gas-control rod movable outwardly to turn on the gas, and inwardly to cut it off; a longitudinally movable switch-stop pin for locking the magneto switch in its normal non-contact position; and a bar rigidly connected at one end to the gas-control rod, and at its other end rigidly connected to the switch-stop pin, said gas-control rod and said switch-stop pin being disposed parallel to each other and mounted to move longitudinally in unison with each other, and both being disposed in the same plane, the inner ends of said rod and pin projecting inwardly through the dash-board of the plane to respectively adapt the rod to be operatively engaged by the hand of the operator, and to cause the inner end of the pin to project into the path of the magneto switch when said pin is moved to its inward position; whereby to simultaneously cut off the flow of gas and lock the magneto-switch against movement to its contact position when said rod and pin are moved to their inward position.

2. A device of the character described having a manually-operated magneto switch movable into and out of contact position, and standing normally in its non-contact position; and a manually-operated fuel-control member operable independently of said magneto switch in both the contact and non-contact positions of said switch, being movable in one direction to turn on the fuel supply, and in the opposite direction to cut it off; and means rigidly connected with said fuel-control member for blocking the movement of the magneto switch from its inoperative position to its operative position when the fuel-supply member is in cut-off position.

3. A device of the character described having a magneto switch and a fuel-supply member both manually movable into and out of operative position, and both standing normally in their respective inoperative positions; said fuel-supply member being always operable independently of the magneto switch, and having rigidly-connected mechanism a part of which projects into the path of the magneto switch as it is moved from its non-contact position to its contact position, whereby to block movement of the magneto switch from its inoperative position to its operative position when the fuel-supply mechanism is in its cut-off position; also whereby, when it is desired to turn on both fuel and electricity to make a take off, the fuel-supply member will have to be turned on first.

4. A device of the character described having a manually operated magneto switch movable into contact and non-contact position; and manually-controlled fuel-supply mechanism for turning on and cutting off the fuel-supply, said parts when in their respective normal positions, being operable only one at a time beginning with the fuel-supply mechanism; and this fuel-supply mechanism being always operable independently of the relative position or operation of the magneto switch; and means carried by the fuel supply mechanism for blocking the magneto switch in its normal inoperative position when the fuel-supply mechanism is in its cut-off position.

5. An airplane engine having an ignition switch, and fuel-control mechanism, each held normally in inoperative position, and each manually operable, one at a time, the fuel supply mechanism being operable independently of the magneto switch, and having a portion movable into the path of said switch to block the movement thereof when the parts are in their respective normal inoperative positions; whereby to compel the operation of the fuel-supply mechanism first, when said parts are operated.

SAMUEL S. YEAGER.